United States Patent [19]
Arai et al.

[11] Patent Number: 6,123,398
[45] Date of Patent: Sep. 26, 2000

[54] RUNNING STABLIZING APPARATUS TO BE MOUNTED ON VEHICLE

[75] Inventors: Kentaro Arai; Tetsuro Hamada, both of Tochigi-ken, Japan

[73] Assignee: Honda Giken Kogyo Kabushiki Kaisha, Tokyo, Japan

[21] Appl. No.: 09/154,166

[22] Filed: Sep. 16, 1998

[30] Foreign Application Priority Data

Sep. 18, 1997 [JP] Japan ..................................... 9-253468

[51] Int. Cl.$^7$ ........................................................ B60J 8/24
[52] U.S. Cl. .......................... 303/140; 303/146; 303/151; 180/6.5; 180/65.2; 180/243
[58] Field of Search .................... 180/6.48, 6.5, 180/76, 65.1, 65.2, 65.3, 65.4, 65.5, 65.6, 65.7, 65.8, 242, 243, 245, 247, 248; 303/139, 140, 146, 151

[56] References Cited

U.S. PATENT DOCUMENTS

| | | | |
|---|---|---|---|
| 3,720,863 | 3/1973 | Ringland et al. ........................... | 318/52 |
| 5,328,255 | 7/1994 | Isella ......................................... | 303/140 |
| 5,645,326 | 7/1997 | Sano .......................................... | 303/140 |
| 5,839,535 | 11/1998 | Arai ........................................... | 180/197 |
| 6,024,182 | 2/2000 | Hamada et al. ........................ | 180/65.2 |
| 6,033,040 | 3/2000 | Inagaki et al. ............................ | 303/146 |

OTHER PUBLICATIONS

Bosch Automotive Handbook, 3rd edition Copyright 1993 pp. 336–339.

*Primary Examiner*—Michael Mar
*Assistant Examiner*—Robert A. Siconolfi
*Attorney, Agent, or Firm*—Armstrong, Westerman, Hattori, McLeland & Naughton

[57] ABSTRACT

A difference rotation generating apparatus which generates a difference rotation between the left and right idler wheels by an output torque of an electric motor. When the driving condition of the vehicle is power-off state or when the slip angle is above a predetermined value, a yawing moment to decrease the slip angle is generated by an independent operation of the left and right brakes. When the slip angle is below the predetermined value, the difference rotation generating apparatus is operated to thereby generate the yawing moment to decrease the slip angle.

2 Claims, 4 Drawing Sheets

1

RUNNING STABLIZING APPARATUS TO BE MOUNTED ON VEHICLE

BACKGROUND OF THE INVENTION

1. Field of the Invention

The present invention relates to a running (or driving) stabilizing apparatus to be mounted on a vehicle such as a motor vehicle in which one of the front and rear wheels are driving wheels to be driven by an engine and the other thereof are idler wheels.

2. Description of the Related Art

As this kind of running stabilizing apparatus, there is conventionally known an art having the following arrangement. Namely, a slip angle of the vehicle, i.e., an inclination of the vehicle relative to the travel (or running) direction of the vehicle is detected. Left and right brakes of the vehicle are independently operated depending on the slip angle. A yawing moment which reduces the slip angle by the difference in the left and right braking forces is generated. The inclination of the vehicle is thus corrected to thereby improve the running stability of the vehicle.

In the above-described conventional art, the brakes are operated depending on the slip angle of the vehicle even in a so-called power-on state in which the accelerator pedal is pressed on to thereby positively drive the driving wheels by the engine. Therefore, the load on the brakes becomes large and the durability thereof becomes poor. Further, the deceleration force is applied to the vehicle as a whole and the driving comfort at the time of acceleration becomes poor.

The present invention has an object of providing a running stabilizing apparatus which can correct the inclination of the vehicle without operating the brakes at the time of power-on state.

SUMMARY OF THE INVENTION

In order to solve the above-described problem, according to the present invention, there is provided a running stabilizing apparatus to be mounted on a vehicle in which one of front wheels and rear wheels are driving wheels to be driven by an engine and the other thereof are idler wheels, the running stabilizing apparatus comprising: a difference rotation generating apparatus for generating difference rotation between the left and right idler wheels by an output torque of an electric motor; means for detecting a slip angle of the vehicle; means for discriminating whether a driving condition of the vehicle is a power-on state in which the driving wheels are positively driven by the engine or a power-off state in which the positive driving of the driving wheels by the engine is stopped; and control means for independently operating left and right brakes of the vehicle in the power-off state and for operating said difference rotation generating apparatus in the power-on state such that a yawing moment to decrease the slip angle is generated depending on the slip angle of the vehicle.

When the difference rotation generating apparatus is operated, there are applied by the output torque of the electric motor a driving force to accelerate one of the left and right idler wheels and a braking force to decelerate the other of the left and right idler wheels. In the power-on state, the yawing moment to decrease the slip angle by the operation of the difference rotation generating apparatus is generated to thereby correct the inclination of the vehicle. Therefore, no undue force is applied to the brakes and they are prevented from being impaired in durability. Further, the braking force to be applied to the idler wheel on one side is canceled by the driving force to be applied to the idler wheel on the other side. A braking force is therefore not operated when the idler wheels are taken as a whole. The driving comfort at the time of acceleration is therefore not impaired.

For the purpose of decreasing the weight of the vehicle, a large-sized motor cannot be used as the electric motor. There is therefore a limit to the yawing moment that can be generated by the difference rotation generating apparatus. As a result, when the slip angle becomes large, it becomes difficult to correct the inclination of the vehicle by means of the difference rotation generating apparatus. Therefore, it is desirable to constitute the control means such that the yawing moment is generated by an independent operation of the left and right brakes when the slip angle is above a predetermined value even in the power-on state.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
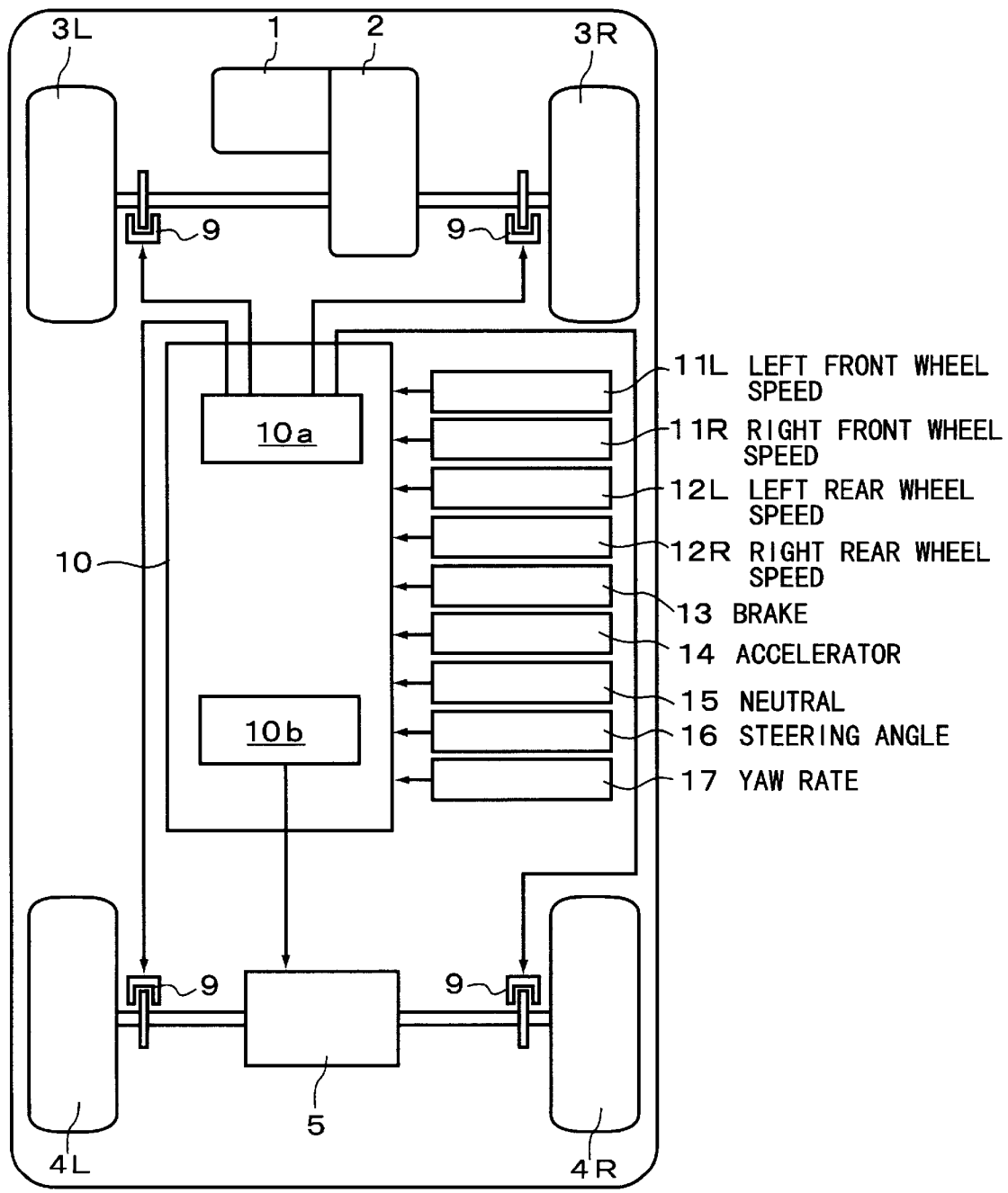
FIG. 1 is a skeleton diagram showing one example of the running stabilizing apparatus of the present invention.

FIG. 1 shows a front-wheel-drive vehicle in which left and right front wheels 3L, 3R are driven by an engine 1 via a transmission 2. Between left and right rear wheels 4L, 4R which are idler wheels, there is disposed a difference rotation generating apparatus 5.

Figure 2:
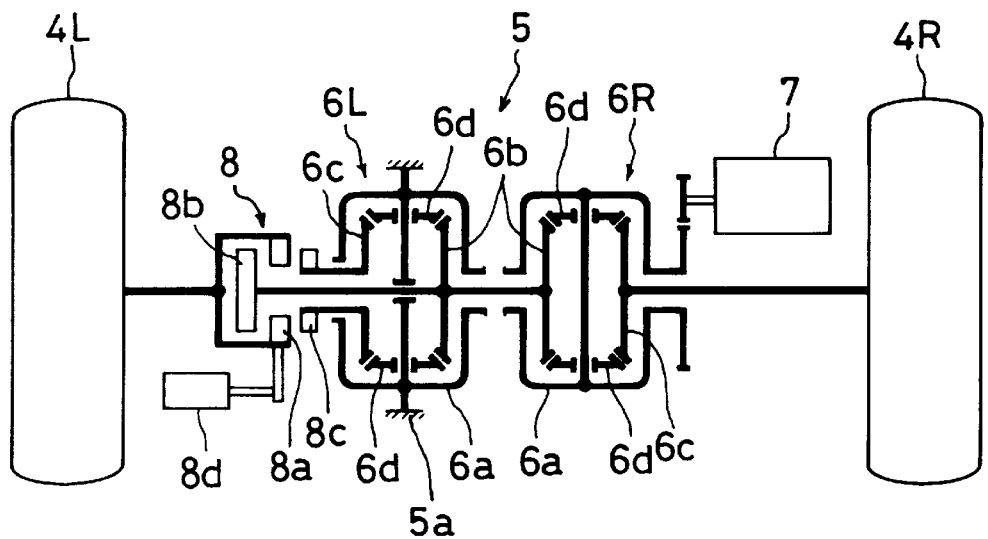
FIG. 2 is a skeleton diagram showing the construction of the difference rotation generating apparatus.

The difference rotation generating apparatus 5 is provided, as shown in FIG. 2, with a pair of left and right differential gears 6L, 6R and an electric motor 7 which is made up of a small-sized DC brush motor to be used as a starter or the like.

Each of the differential gears 6L, 6R is constituted by a bevel gear type of differential gear which is made up by rotatably supporting, on a differential gear case 6a, a pair of left and right side gears 6b, 6c which are made up of bevel gears, as well as pinions 6d which are engaged with both the side gears 6b, 6c. The first side gears 6b, 6b which lie on an axially inner side of both the differential gears 6L, 6R are coupled to each other. The electric motor 7 is connected to the differential gear case 6a of one, e.g., the differential gear 6R on the right side, of both the differential gears 6L, 6R. The right rear wheel 4R is connected to the axially outside second side gear 6c of the differential gear 6R. The differential gear case 6a of the differential gear 6L on the left side is fixed to the casing 5a of the difference rotation generating apparatus 5. The left rear wheel 4L is selectively connected through a switching means 8 to the first side gear 6b on an axially inner side of the differential gear 6L and the second side gear 6c on an axially outer side thereof. The switching means 8 is constituted by a movable dog 8a which is connected to the left rear wheel 4L and which is axially movable back and forth, and stationary dogs 8b, 8c which are respectively mounted on the first side gear 6b and the second side gear 6c of the differential gear 6L on the left side. The movable dog 8a is moved back and forth by means of a solenoid 8d so as to be selectively engaged with both the stationary dogs 8b, 8c.

When the left rear wheel 4L is connected to the first side gear 6b of the differential gear 6L on the left side, the left rear wheel 4L becomes a state of being directly connected to the first side gear 6b of the differential gear 6R on the right side. When the differential gear case 6a of the differential gear 6R on the right side is rotated by the electric motor 7, both the left and right rear wheels 6L, 6R are driven for rotation in the same direction.

When the left rear wheel 4L is connected to the second side gear 6c of the differential gear 6L on the left side, the first side gear 6b is rotated together with the left rear wheel 4L at the same rotational speed in the opposite direction. As long as the left and right rear wheels 4L, 4R are rotated at the same rotational speed, the differential gear case 6a of the differential gear 6R on the right side will not rotate. Then, when the differential gear case 6a of the differential gear 6R on the right side is rotated by the electric motor 7 in the normal direction, the second side gear 6c of the differential gear 6R on the right side is rotated with increasing speed relative to the first side gear 6b. The right rear wheel 4R is thus rotated with increasing speed than is the left rear wheel 4L. The output torque of the electric motor 7 is thus transmitted to the right rear wheel 4R as a driving force and to the left rear wheel 4L as a braking force, whereby a yawing moment toward the left is generated. Further, when the differential gear case 6a of the differential gear 6R on the right side is rotated by the electric motor 7 in the reverse direction, the first side gear 6b of the differential gear 6R on the right side is rotated with increasing speed relative to the second side gear 6c. The left rear wheel 4L is thus rotated with increasing speed than is the right rear wheel 4R. The output torque of the electric motor 7 is thus transmitted to the left rear wheel 4L as a driving force and to the right rear wheel 4R as a braking force, whereby a yawing moment toward the right is generated.

The vehicle has mounted thereon a controller 10 having a control section 10a which controls the brake 9 of each of the wheels 3L, 3R, 4L, 4R and a control section 10b which controls the electric motor 7 and the switching means 8 of the difference rotation generating apparatus 5.

To the controller 10 there are inputted the following signals, i.e., signals from sensors 11L, 11R which detect the rotational speeds of the left and right front wheels 3L, 3R, sensors 12L, 12R which detect the rotational speeds of the left and right rear wheels 4L, 4R, a brake switch 13 which is switched on by pressing on a brake pedal, an accelerator pedal switch 14, a neutral switch 15 which detects whether the transmission 2 is in the neutral state of not, a steering angle sensor 16, and a yaw rate sensor 17. The starting assistance control, the cornering assistance control, and the running stabilizing control are performed as described hereinbelow.

The starting assistance control is performed in the following manner. Namely, by making the switching means 8 to a state in which the left rear wheel 4L is connected to the first side gear 6b of the differential gear 6L on the left side, the electric motor 7 is rotated in the normal direction or in the reverse direction. The left and right rear wheels are thus rotated either in the normal direction or in the reverse direction, whereby the starting assistance for forward running or reverse running is performed. When the following four conditions are met, i.e., that the brake switch 13 is switched off, that the accelerator switch 14 is switched on, that the transmission 2 is in the non-neutral state, and that the vehicle speed (rear wheel speed) is below a predetermined value, a judgement is made that the vehicle is in a state ready to start. When the front wheels 3L, 3R are slipped whereby the difference between the front wheel speed and the rear wheel speed has exceeded a predetermined value in the above-described state, the starting assistance control is performed. After the vehicle has started, the switching means 8 is switched and held to the state in which the left rear wheel 4L is connected to the second side gear 6c of the differential gear 6L on the left side, and the driving of the electric motor 7 is once stopped.

The cornering assistance control is performed at the time of turning or cornering of the vehicle. In this control, the electric motor 7 is driven so that the rear wheel on the outer side, between the left and right rear wheels 4L, 4R, is rotated with increasing speed. A yawing moment in the cornering direction is generated by giving a driving force to the outer wheel and a braking force to the inner wheel, thereby assisting the cornering movement of the vehicle.

Figure 3:
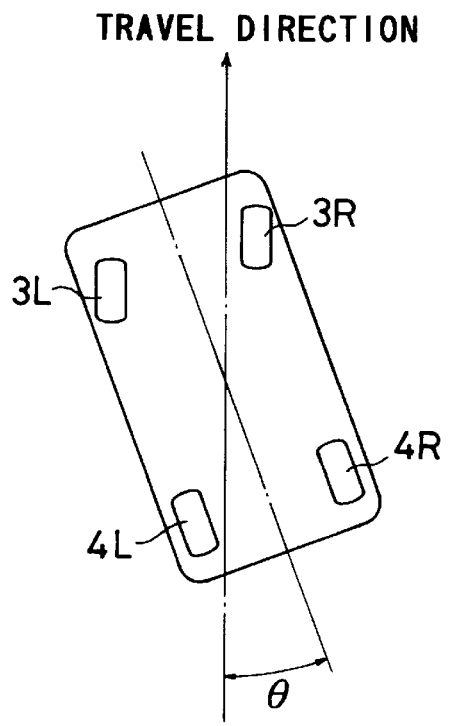
FIG. 3 is a schematic diagram showing a condition in which a slip angle has occurred.
Figure 4:
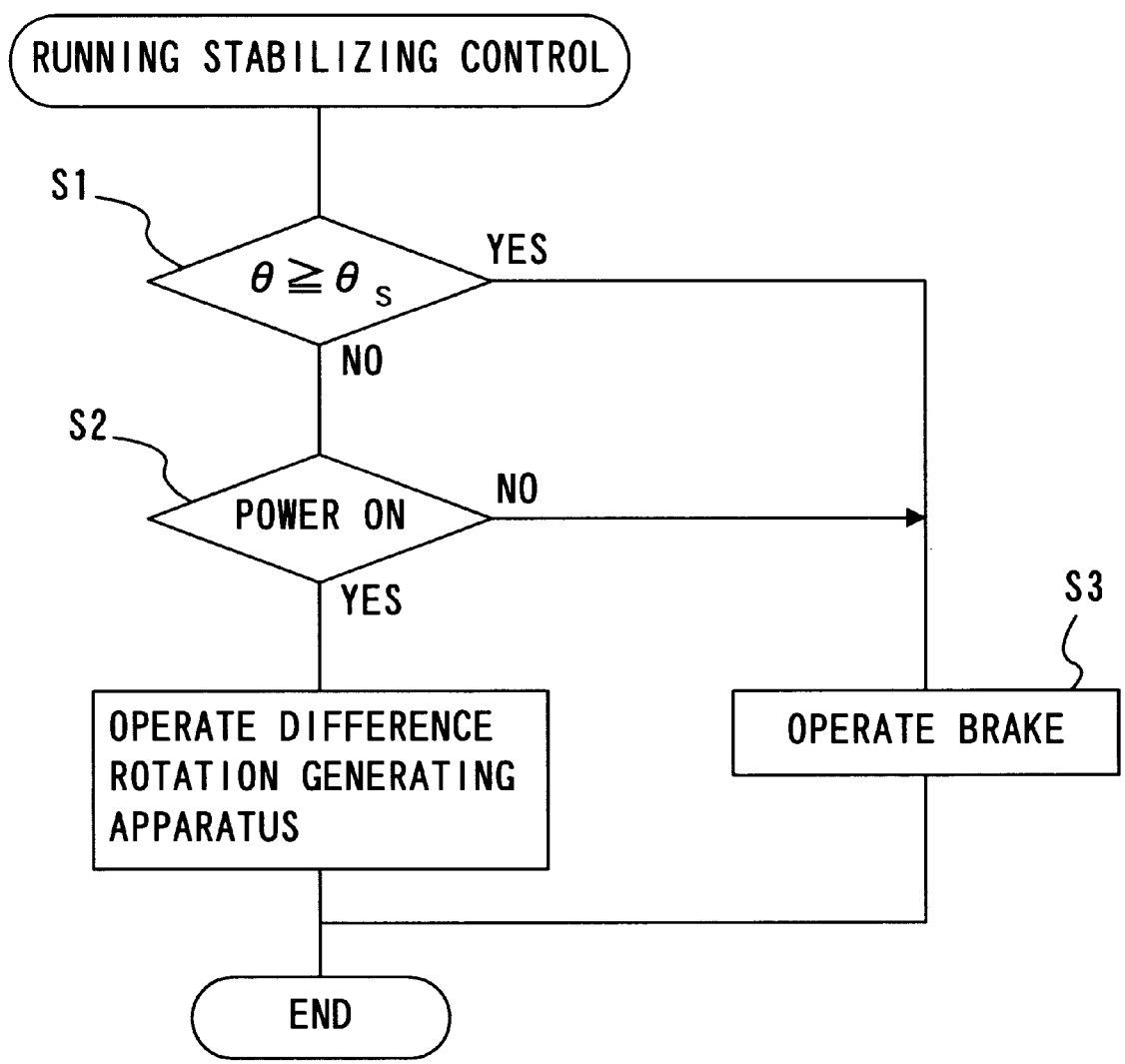
FIG. 4 is a flow chart showing the contents of running stabilizing control.

The running stabilizing control is performed when the vehicle has inclined relative to the running direction as shown in FIG. 3. The contents of the control are as shown in FIG. 4. An explanation will be made in more detail about it.

A discrimination is made first as to whether the slip angle $\theta$ of the vehicle is above a predetermined value $\theta$s or not (S1). The slip angle $\theta$ is computed by a comparison between a reference yaw rate of the vehicle which is computed by the vehicle speed and the steering angle, and the actual yaw rate which is detected by the yaw rate sensor 17.

If $\theta < \theta$s, a discrimination is made as to whether the accelerator switch 14 has been switched on as a result of the pressing on of the accelerator pedal, i.e., whether the driving condition of the vehicle is in a so-called power-on state in which the front wheels 3L, 3R are positively driven by the engine 1 (S2). When the accelerator switch 14 is switched off, i.e., when the vehicle is in a so-called power-off state in which the positive driving of the front wheels 3L, 3R by the engine 1 is stopped, the left and right brakes 9 are independently operated so that the yawing moment to reduce the slip angle $\theta$ can be generated (S3). In other words, if the slip angle $\theta$ shows an inclination toward the left, the brakes 9 of the right front and rear wheels 3R, 4R are operated. If the slip angle $\theta$ shows an inclination toward the right, the brakes 9 of the left front and rear wheels 3L, 4L are operated. Also when $\theta \geq \theta$s, the left and right brakes 9 are operated independently.

If $\theta < \theta$s and if the driving condition of the vehicle is in the power-on state, the difference rotation generating apparatus 5 is operated to thereby generate the yawing moment to reduce the slip angle $\theta$. In other words, if the slip angle $\theta$ shows an inclination toward the left, the electric motor 7 is driven in the reverse direction.

The left rear wheel 4L is thus accelerated to thereby generate the yawing moment toward the right. If the slip angle $\theta$ shows an inclination toward the right, the electric motor 7 is driven in the normal direction. The right rear wheel 4R is thus accelerated to thereby generate the yawing moment toward the left.

In this manner, in a power-on state, the inclination of the vehicle is corrected by the difference rotation generating apparatus 5 unless the condition of $\theta \geq \theta$s is satisfied.

Therefore, the frequency of operation of the brakes 9 in the power-on state is extremely small, with the result that the durability of the brakes 9 will not be impaired.

Figure 5:
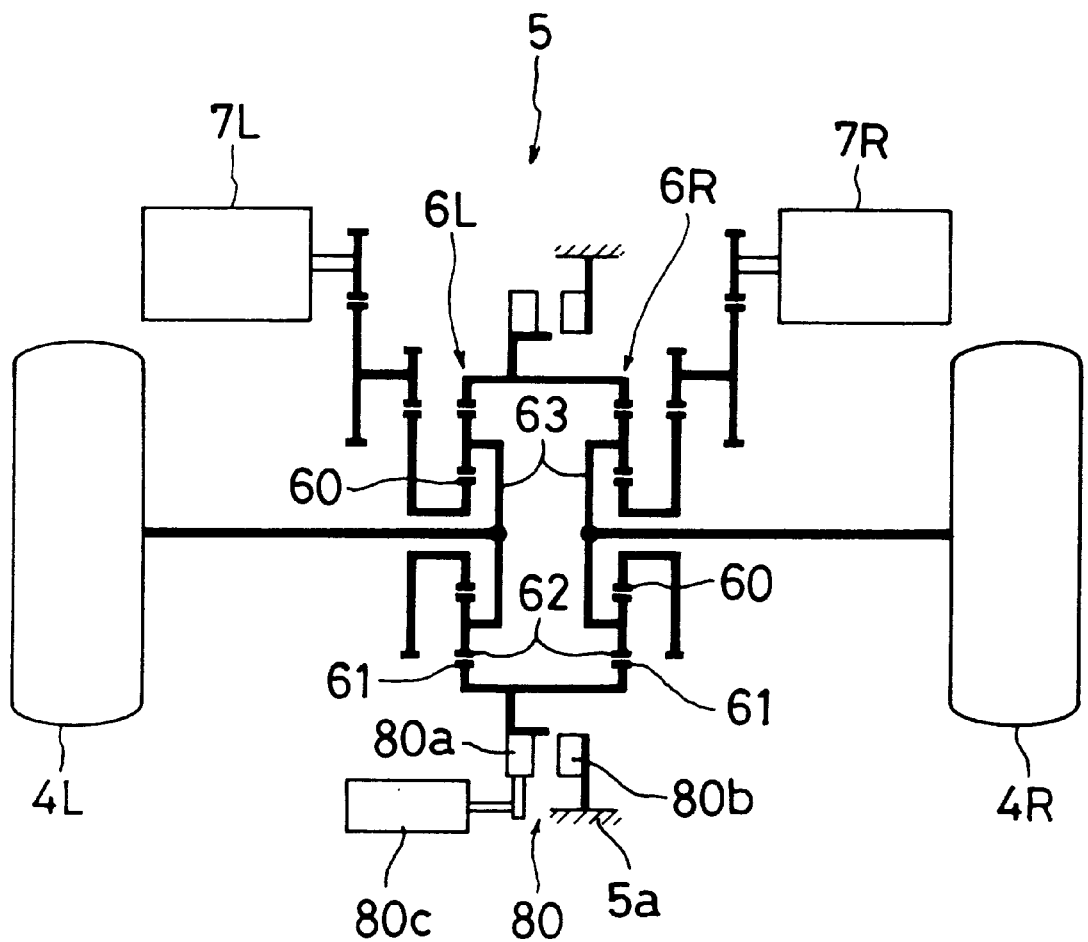
FIG. 5 is a skeleton diagram showing another embodiment of the difference rotation generating apparatus.

The difference rotation generating apparatus 5 is not limited to the above-described embodiment. As shown in FIG. 5, an arrangement may also be made such that there are provided a pair of left and right differential gears 6L, 6R and a pair of left and right electric motors 7L, 7R.

In this embodiment, each of the differential gears 6L, 6R is constituted by a planetary type of differential gear having a sun gear 60, a ring gear 61, and a carrier 63 which rotatably supports a planetary pinion 62 which is engaged with both the gears 60, 61. Left and right rear wheels 4L, 4R are respectively connected to the carriers 63, 63 of the left and right differential gears 6L, 6R. The left and right electric motors 7L, 7R are connected to the sun gears 60, 60 of the left and right differential gears 6L, 6R. The ring gears 61, 61 of both the left and right differential gears 6L, 6R are connected to each other. A brake means 80 to restrain the rotation of this ring gear 61 is provided. The brake means 80 is constituted by a movable dog 80a which is prevented from rotating relative to the ring gear 61 and which is axially movable back and forth, as well as a stationary dog 80b which is fixed to the casing 5a of the difference rotation generating apparatus 5. The movable dog 80a is engaged with, and disengaged from, the stationary dog 80b by the back and forth movement by means of a solenoid 80c. The restraining and releasing of the ring gear 61 are thus performed.

When the brake means 80 is switched on to thereby restrain the ring gear 61, the ring gear functions as a reaction force receiving member. By the rotation in the normal or reverse direction of the sun gears 60, 60 of the left and right differential gears 6L, 6R as a result of the rotation in the normal or reverse direction of the left and right electric motors 7L, 7R, the carriers 63, 63 of both the differential gears 6L, 6R are rotated in the normal or reverse direction. The left and right rear wheels 4L, 4R are thus driven for rotation in the same direction.

When the brake means 80 is switched off to thereby release the restraining of the ring gear 61, and both the electric motors 7L, 7R are driven in the opposite directions, for example, the left electric motor 7L is rotated in the normal direction and the right electric motor 7R is rotated in the reverse direction, the sun gear 60 of the differential gear 6L on the left side is rotated in the normal direction and its carrier 63 is rotated in the normal direction relative to the ring gear 61. And the sun gear 60 of the differential gear 6R on the right side is rotated in the reverse direction and its carrier 63 is rotated in the reverse direction relative to the ring gear 61. Therefore, with the rotational speed of the ring gear 61 as a reference or basis, the carrier 63 of the differential gear 6L on the left side, i.e., the left rear wheel 4L is accelerated, and the carrier 63 of the differential gear 6R on the right side, i.e., the right rear wheel 4R is decelerated. As a result, a driving force is applied to the left rear wheel 4L and a braking force is applied to the right rear wheel 4R, whereby a yawing moment toward the right is generated. On the other hand, if the left electric motor 7L is rotated in the reverse direction and the right electric motor 7R is rotated in the normal direction, a braking force is applied to the left rear wheel 4L and a driving force is applied to the right rear wheel 4R, whereby a yawing moment toward the left is generated.

In this manner, by using a controller that is the same as the one described above, the starting assistance control and the cornering assistance control, and the running stabilizing control can be performed in the same manner as the above-described embodiment.

The following arrangement may also be employed. Namely, by deleting the switching means 8 in the embodiment shown in FIG. 2, the left rear wheel 4L is constantly connected to the second side gear 6c of the left differential gear 6L. Further, by deleting the braking means 80 in the embodiment shown in FIG. 5, the ring gear 81 is made constantly free to thereby perform only the cornering assistance control and the running stabilizing control.

An explanation has so far been made about the front-wheel-drive vehicle in which the rear wheels 4L, 4R are idler wheels. The present invention can also be applied to a rear-wheel-drive vehicle in which the front wheels are idler wheels.

As can be seen from the above-described explanations, according to the present invention, the frequency of operating the brakes in a power-on state becomes small. Therefore, the brakes can be prevented from being impaired in durability in the running stabilizing control, and the driving comfort at the time of acceleration can also be prevented from being impaired.

It is readily apparent that the above-described running stabilizing apparatus to be mounted on a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A running stabilizing apparatus to be mounted on a vehicle in which one of the front wheels and rear wheels are driving wheels to be driven by an engine and the other thereof are idler wheels, said running stabilizing apparatus comprising:

a difference rotation generating apparatus for generating difference rotation between the left and right idler wheels by an output torque of an electric motor;

means for detecting a slip angle of the vehicle;

means for discriminating whether a driving condition of the vehicle is a power-on state in which the driving wheels are positively driven by the engine or a power-off state in which the positive driving of the driving wheels by the engine is stopped, wherein said power-on state is indicated by depressing an accelerator pedal and said power-off state is indicated by releasing the accelerator pedal; and control means for independently operating left and right brakes of the vehicle in the power-off state and for operating said difference rotation generating apparatus in the power-on state such that a yawing moment to decrease the slip angle is generated depending on the slip angle of the vehicle.

2. A running stabilizing apparatus according to claim 1, wherein said control means is constituted such that the yawing moment is generated by an independent operation of the left and right brakes when the slip angle is above a predetermined value even in the power-on state.

* * * * *